US006962562B2

(12) United States Patent
Depelsenaire et al.

(10) Patent No.: US 6,962,562 B2
(45) Date of Patent: Nov. 8, 2005

(54) SLUDGE INERTING METHOD

(75) Inventors: Guy Depelsenaire, Court-Saint-Etienne (BE); René Derie, Brussels (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 10/399,031

(22) PCT Filed: Oct. 16, 2001

(86) PCT No.: PCT/EP01/11928

§ 371 (c)(1),
(2), (4) Date: Sep. 2, 2003

(87) PCT Pub. No.: WO02/32817

PCT Pub. Date: Apr. 25, 2002

(65) Prior Publication Data

US 2004/0112842 A1 Jun. 17, 2004

(30) Foreign Application Priority Data

Oct. 17, 2000 (FR) .............................. 00 13417

(51) Int. Cl.$^7$ ............................... C02F 11/18
(52) U.S. Cl. .................. 588/256; 588/407; 588/313; 588/321
(58) Field of Search ................. 588/209, 252, 588/256; 580/257, 321, 313, 407

(56) References Cited

U.S. PATENT DOCUMENTS

| | | | |
|---|---|---|---|
| 3,947,283 A | | 3/1976 | Uchikawa et al. |
| 4,982,039 A | * | 1/1991 | Benson et al. ............. 585/469 |
| 5,037,286 A | | 8/1991 | Roberts |
| 6,084,139 A | * | 7/2000 | Van Der Giessen et al. ............. 585/240 |
| 6,132,355 A | * | 10/2000 | Derie ............. 588/252 |
| 6,136,063 A | * | 10/2000 | Brosnan ............. 588/252 |

FOREIGN PATENT DOCUMENTS

WO   97 31874   9/1997

* cited by examiner

Primary Examiner—John Kreck
(74) Attorney, Agent, or Firm—Oblon, Spivak, McClelland, Maier & Neustadt, P.C.

(57) ABSTRACT

Process for rendering inert a sludge (1) comprising heavy metals and organic matter, according to which phosphoric acid (2) is added to the sludge and the latter is subjected to calcination (6). A hydraulic binder (9) is mixed with the product of the calcination (7) and mixed with water (8). The resulting mixture (11) is subjected to setting and curing.

19 Claims, 3 Drawing Sheets

SLUDGE INERTING METHOD

The present invention relates to a process for rendering sludges inert, in particular cleaning-out sediments.

The problems posed by the constantly increasing amounts of sludges to be removed, treated and stored are well known. These sludges have many sources. They originate, for example, from water purification plants, from the dredging or cleaning out of watercourses or from various industries. The case of sediments from the cleaning out of waterways is a particular concern in the light of the amounts concerned and their contamination by pollutants such as heavy metals and organic matter. A significant proportion of the waterways of northern Europe is currently blocked by sludges which interfere with the movement of shipping therein. The direct or indirect economic and environmental consequences of this are very significant. Furthermore, it is well known that this worrying situation for the waterway system is mainly due to the disadvantages of the current solutions for the treatment and storage of contaminated sludges.

This is because a convenient means for the removal of sludges consists in discharging them by boat at sea or in conveying them by means of pipelines to settling disposal sites. However, when the sludges are contaminated by heavy metals or dangerous organic matter (which is generally the case with the sediments originating from the cleaning out waterways), this means is obviously unacceptable. In fact, before being able to be discharged, the sludges have to be rendered inert in order to satisfy the tests for nontoxicity. To this end, the waste from the inerting treatment is subjected to leaching, for example according to the French "TL" or Dutch "NEN" standards defined below. The leachates are then analysed and their contents of various pollutants have to remain below thresholds set by legislation. In particular, there exist "class 1 stabilized waste" acceptance standards.

In order to treat large amounts of sludges with the aim of being able to remove them, it is known to calcine them and to mix them subsequently with a hydraulic binder (Gray and Penessis, "Engineering properties of sludge ash", Journal WPCF, Vol. 44, No. 5, May 1976, p. 847–858). Such a treatment reduces the volume of the sludges and makes it possible, by virtue of the solidification obtained, to recover them in value in various applications. However, when the sludges are contaminated by heavy metals and in particular by lead, this known treatment does not allow them to be rendered sufficiently inert for them to become harmless.

The invention is targeted at overcoming the abovementioned disadvantages by providing a process for the treatment of sludges contaminated by heavy metals and organic matter which is simple and economic and converts the sludges to compact blocks which exhibit good mechanical properties and which satisfy standardized tests for toxicity.

Consequently, the invention relates to a process for rendering inert sludge comprising heavy metals and organic matter in which the sludge is subjected to a calcination and mixed with water, and the resulting mixture is subjected to setting and curing, the process being characterized in that phosphoric acid is added to the sludge before the calcination stage.

The term "sludge" is understood to denote an aqueous substance comprising silt, mud and inorganic matter in suspension (sand, indeed even gravel). The sediments originating from the cleaning out of waterways constitute an example of sludges to which the invention applies. The width of the particle size distribution of the particles in suspension in the sludge can be very large, for example from less than 1 micron to several hundred microns. The sludges often comprise a high content of very fine particles. It is frequent that 10% of the weight of the dried sludge is composed of particles having a diameter of less than 5 microns, whereas the content of small stones having a diameter of greater than 500 microns can reach several per cent. Furthermore, the particle size histograms of some sludges have the distinguishing feature of being multimodal, that is to say that they exhibit several maxima.

The sludges can be rendered inert as such. They can also be subjected to a pretreatment during which the larger particles are removed.

The sludges which it is desired to render inert can comprise a variable amount of water, depending on their source. It is usual for the sludges to be rendered inert to comprise an amount by weight of water of greater than 20%. This amount is usually between 30 and 60%. It is generally less than 70%.

For the process according to the invention, the sludges which comprise amounts by weight of water of greater than 30% are very suitable. However, amounts of greater than 70% or, in some cases, 60% are to be avoided as they increase the cost of the process. As the majority of the sludges to be treated have a content by weight of water varying between 30 and 60%, it is generally unnecessary either to add water or to abstract it (by separation by settling, evaporation, and the like).

The term "heavy metals" is understood to denote metals with a density at least equal to 5 g/cm$^3$, as well as beryllium, arsenic, selenium and antimony, in accordance with the generally accepted definition (Heavy Metals in Wastewater and Sludge Treatment Processes; Vol. I, CRC Press Inc; 1987; page 2). Lead is a particularly significant example thereof, given its harmful effect on the human body. The sludges rendered inert by the process according to the invention can also comprise aluminium metal.

The organic matter can be in the liquid state or in the solid state in the sludge. It can, for example, comprise nonpolar hydrocarbons, aliphatic or aromatic (mono- or polycyclic) hydrocarbons and halogenated solvents.

According to the invention, phosphoric acid is added to the sludge. The amount of phosphoric acid to be employed depends on the precise composition of the sludge to be treated. Without wishing to be committed to a theoretical explanation, the inventor believes that, following the addition of phosphoric acid, calcium pyrophosphate is formed during the calcination. This pyrophosphate proves to be a scavenger for heavy metals. Consequently, the precise amount of phosphoric acid to be employed depends on the content of these heavy metals in the sludge. In practice, an amount by weight of at least 1% (preferably 2%) with respect to the weight of dry matter is to be employed. It is preferable for the amount of phosphoric acid to be less than 15%. Amounts of between 2 and 6% are generally highly suitable.

The calcination is intended to destroy the organic matter. The calcination is generally carried out at a temperature of greater than 450° C. in order for the organic matter to be sufficiently destroyed. It is advisable to avoid an excessive temperature, which would have the result of vaporizing a portion of the heavy metals. In practice, the calcination temperature is less than 1000° C. In a preferred alternative form of the process according to the invention, the calcination temperature is greater than 500° C. and less than 800° C. In order to be particularly effective in destroying the organic matter and in volatilizing as little as possible of heavy metals, it is particularly advantageous for the calcination temperature to be greater than 550° C. and less than 750° C.

It has been observed that the calcination is advantageously carried out under a controlled atmosphere.

To this end, in a specific embodiment of the process according to the invention, this atmosphere is oxidizing. This alternative form facilitates the setting of the mortar. In this case, it is possible, for example, to use ambient air. It is then necessary to take care that a sufficient amount of air is available in the furnace.

In another specific embodiment, the atmosphere is reducing. This embodiment is in particular advantageous in that it inhibits the formation of chromium(VI).

The duration of the calcination depends on the composition of the sludge to be rendered inert and on the arrangement of the material in the calcination furnace. It must also be sufficient to destroy the organic matter and to produce enough pyrophosphate.

During the calcination stage, it was observed that some sludges, in particular those rich in calcite, give rise to the formation of pozzuolanic materials. This phenomenon is more pronounced when the calcination temperature exceeds 750° C. In this case, it is not necessary to add a hydraulic binder to bring about setting and curing.

In a specific embodiment of the invention, a hydraulic binder is mixed with the product of the calcination.

The hydraulic binder is commonly composed of Portland cement. However, the use of blast furnace slag cement (comprising metallurgical slag) promotes the reduction of chromium(VI). Pozzuolanic materials, such as coal combustion ash, may also be suitable. It is necessary to add, during the mixing of the hydraulic binder with the product of the calcination intended to form the mortar, an amount of mixing water which is sufficient to produce a plastic paste. The amount of hydraulic binder to be employed depends on various parameters, in particular on the hydraulic binder selected, on the composition of the sludges and on the properties desired for the final product of the treatment process according to the invention, in particular its mechanical strength. In practice, it is recommended often to employ an amount by weight of binder of, greater than 1% of the weight of the calcination ash. According to the invention, it is desirable for the weight of the hydraulic binder to be less than 50% and not to exceed, preferably, 30%.

In an advantageous alternative form, use is made of an amount by weight of hydraulic binder of greater than 2% and less than 20% of the product of the calcination.

The form of the solid mass obtained on conclusion of the curing, which can last several days, is that under which the mortar has been shaped. It can comprise, for example, briquettes or spherical or prism-shaped blocks. It is compact and substantially devoid of gas inclusions and, for this reason, exhibits good mechanical properties, in particular a sufficient hardness and a sufficient impact strength to allow it to be handled and stored without difficulties.

The solid and compact mass is substantially inert with respect to atmospheric agents and conforms to the toxicity standards with regard to leachates extracted according to stringent procedures, such as those defined by the "TL" or "NEN" standards.

The French triple leaching "TL" test is described in the French standard XPX 31-210. The protocol of the test consists in milling the material so as to be able to pass it through a 4 mm sieve. This milled material is subjected to triple leaching with demineralized water, in a liquid/solid ratio equal to 10, with constant stirring. On conclusion of each leaching, the content in the washing liquid of the heavy metals from the powder subjected to the test is measured.

The Dutch "NEN" test consists, for its part, in finely milling the sample (under 125 $\mu$m) and in adding water to it in a water:solid ratio of 50. It is then maintained at pH 7 for three hours and then at pH 4 (which is the minimum pH of rain water), also for three hours. Adjustment of the pH is carried out continuously using a 1N solution of nitric acid (noncomplexing acid). The content in the liquid phase of heavy metals is then determined by analysis.

In a particularly advantageous way, the setting and the curing of the mortar are carried out at its final storage site. This site will be, for example, advantageously a disused quarry, a lake or any cavity which it is desired to fill in. If the cavity is initially filled with water, it will not be necessary to completely extract the latter, the setting and the curing of the mortar being in no way impeded by the presence of water. Disused quarries are particularly well suited to the storage of the sludges rendered inert by the process according to the invention.

According to a particularly advantageous embodiment of the process according to the invention, a reducing additive is incorporated in the mixing water. By way of example, this additive can be selected from: iron, manganese, iron(II) compounds, manganese(II) compounds or reducing salts of alkali metals. In this embodiment of the process, the reducing agent is added in an amount by weight of between 0.1 and 1% of the weight of dry matter present in the sludge.

In a preferred alternative form of this embodiment, the reducing additive is sodium sulphite.

For the application of the process according to the invention, the source of the sludges is not critical. The process can, for example, be applied:

to the sludges resulting from the separation by settling of wastewater of industrial or municipal origin, to the sediments originating from the dredging or cleaning out of rivers, ponds, wells or sewers, to the sediments originating from the cleaning out of waterways (e.g. ports, lakes, rivers or canals).

However, the invention is particularly suited to the sludges composed of sediments originating from the cleaning out of waterways.

The invention is illustrated by the following description, with reference to the appended drawings.

Figure 1:
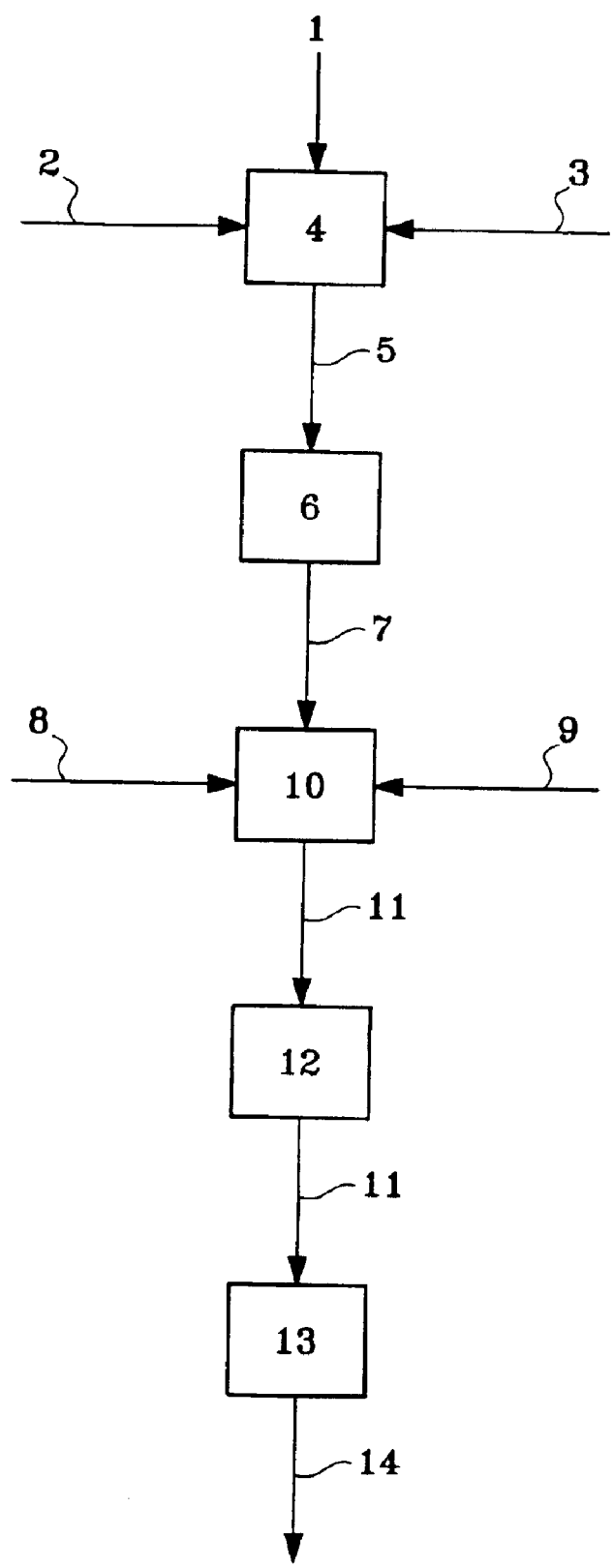
FIG. 1 represents the diagram of a plant employing a specific embodiment of the process according to the invention.

The plant represented diagrammatically in the figure is intended for the treatment of cleaning-out sediments 1, comprising heavy metals and organic matter. It comprises a reaction chamber 4 in which a sufficient amount of phosphoric acid 2 and optionally, if necessary, of water 3 is added to the cleaning-out sediment 1 to form, by mixing, a pumpable mass 5. The pumpable mass 5 is withdrawn from the reaction chamber 4 and is introduced into a calcination furnace 6 where it is heated at a temperature in the region of 650° C. in the presence of air for a time sufficient to decompose the organic matter. The calcined material 7 extracted from the furnace 6 is transferred to a mixing chamber 10 where water 8 and a hydraulic binder 9 are added to it in amounts adjusted in order to form, by mixing with the calcined material 7, a hydraulic mortar 11. The mortar 11 is pumped from the mixing chamber 10 and conveyed via pipes 12 to a disused quarry 13, into which it is poured. The mortar 11 is then subjected to setting and curing at the same site of its storage to form a stabilized waste 14.

The examples described below will reveal the advantage of the invention.

First Series of Tests

Figure 2:
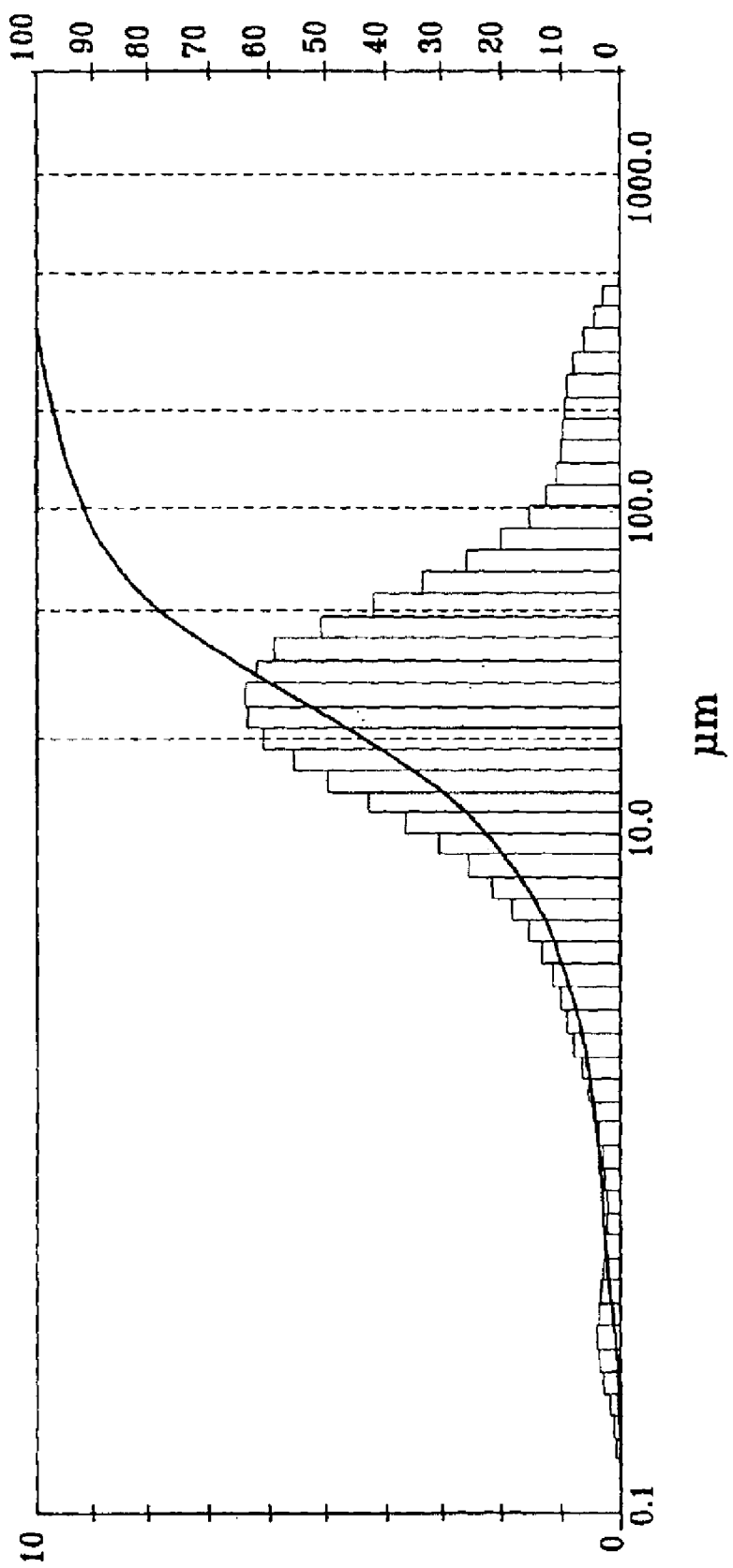
FIG. 2 is a histogram of the particle size distribution of a sludge subjected to the process according to the invention.

In Examples 1 to 4, described below, sludges removed from a canal were treated. The composition by weight of the sludge is given in the following Table 1. The particle size distribution of the sludge is illustrated in FIG. 2, in which the scale of the abscissae represents the diameter of the particles, the scale of the left-hand ordinates represents the particle size distribution in relative units and the scale of the right-hand ordinates represents the cumulative fractions of the distribution, as % by weight of dry matter.

TABLE 1

| Constituents | Content by weight (by weight of dry matter) |
|---|---|
| Cd | 14 mg/kg |
| Co | 19 mg/kg |
| Cr | 200 mg/kg |
| Cu | 170 mg/kg |
| Ni | 190 mg/kg |
| Pb | 950 mg/kg |
| Organic matter | 157 g/kg |
| $CaCO_3$ | 118 g/kg |
| Water | 1 kg/kg |

EXAMPLE 1

(Not in Accordance with the Invention)

Portions of sludges corresponding to 1 kg of dry matter (i.e. 2 kg of crude sludge) were placed in terracotta containers and calcined for 1 hour at a temperature of 600° C. (starting furnace cold, raised to 600° C. over 1 h). 10% of ordinary Portland cement, i.e. 12 g of cement per 108 g of calcined sludge, were subsequently added to the calcination product. These samples of 120 g were then mixed with a sufficient amount of water to produce a plastic paste, i.e. approximately 55 ml, and were run into polypropylene centrifuge tubes with a diameter of 37 mm. After 28 days, the solidified cores were removed from the moulds and compressive test specimens with a height of 40 mm approximately were produced therefrom with a diamond saw. After dressing the faces and drying at normal temperature for two days, the densities of the samples were measured. Finally, the samples were subjected to the "TL" leaching test defined above. The results of the density measurement and of the leaching test are given in Table 2:

TABLE 2

| | "TL" Triple leaching | | | | | |
|---|---|---|---|---|---|---|
| | 1st | | 2nd | | 3rd | |
| Density ($kg/dm^3$) | pH | Cr(VI) (mg/l) | pH | Cr(VI) (mg/l) | pH | Cr(VI) (mg/l) |
| 1.30 | 11.6 | 0.26 | 11.5 | 0.07 | 11.4 | 0.006 |

EXAMPLE 2

(In Accordance with the Invention)

In Example 2, the same procedure was carried out as in Example 1 except that, in accordance with the invention, 29.5 g of 85% by weight phosphoric acid per 1 kg of dry matter were added to the dry matter, the homogenization being provided by a hand mortar mixer. The results of the mechanical and leaching tests are given in Table 3:

TABLE 3

| | "TL" Triple leaching | | | | | |
|---|---|---|---|---|---|---|
| | 1st | | 2nd | | 3rd | |
| Density ($kg/dm^3$) | pH | Cr(VI) (mg/l) | pH | Cr(VI) (mg/l) | pH | Cr(VI) (mg/l) |
| 1.24 | 11.6 | 0.028 | 11.5 | 0.002 | 11.4 | N.D. |

The sharp decrease in contamination by Cr(VI) is observed. In the third leaching, the amounts are not detectable. Contaminations with lead are undetectable by this test (<50 μg/l).

EXAMPLE 3

(Not in Accordance with the Invention)

The same procedure was carried out as in Example 1 but replacing the "TL" test with the "NEN" test. This more stringent test makes it possible to demonstrate contaminations with lead. The results are given in Table 4:

TABLE 4

| Cd (mg/l) | Cr (mg/l) | Ni (mg/l) | Pb (mg/l) | 1N $HNO_3$ added (ml) |
|---|---|---|---|---|
| 0.07 | 0.15 | 0.05 | 0.48 | 19.1 |

EXAMPLE 4

(In Accordance with the Invention)

The same procedure was carried out as in Example 2 but replacing the "TL" test by the "NEN" test.

TABLE 5

| Cd (mg/l) | Cr (mg/l) | Ni (mg/l) | Pb (mg/l) | 1N $HNO_3$ added (ml) |
|---|---|---|---|---|
| 0.05 | 0.13 | 0.06 | 0.13 | 18.3 |

The results recorded in Table 5 show a very sharp decrease in contamination with lead by virtue of the treatment in accordance with the invention.

Second Series of Tests

Figure 3:
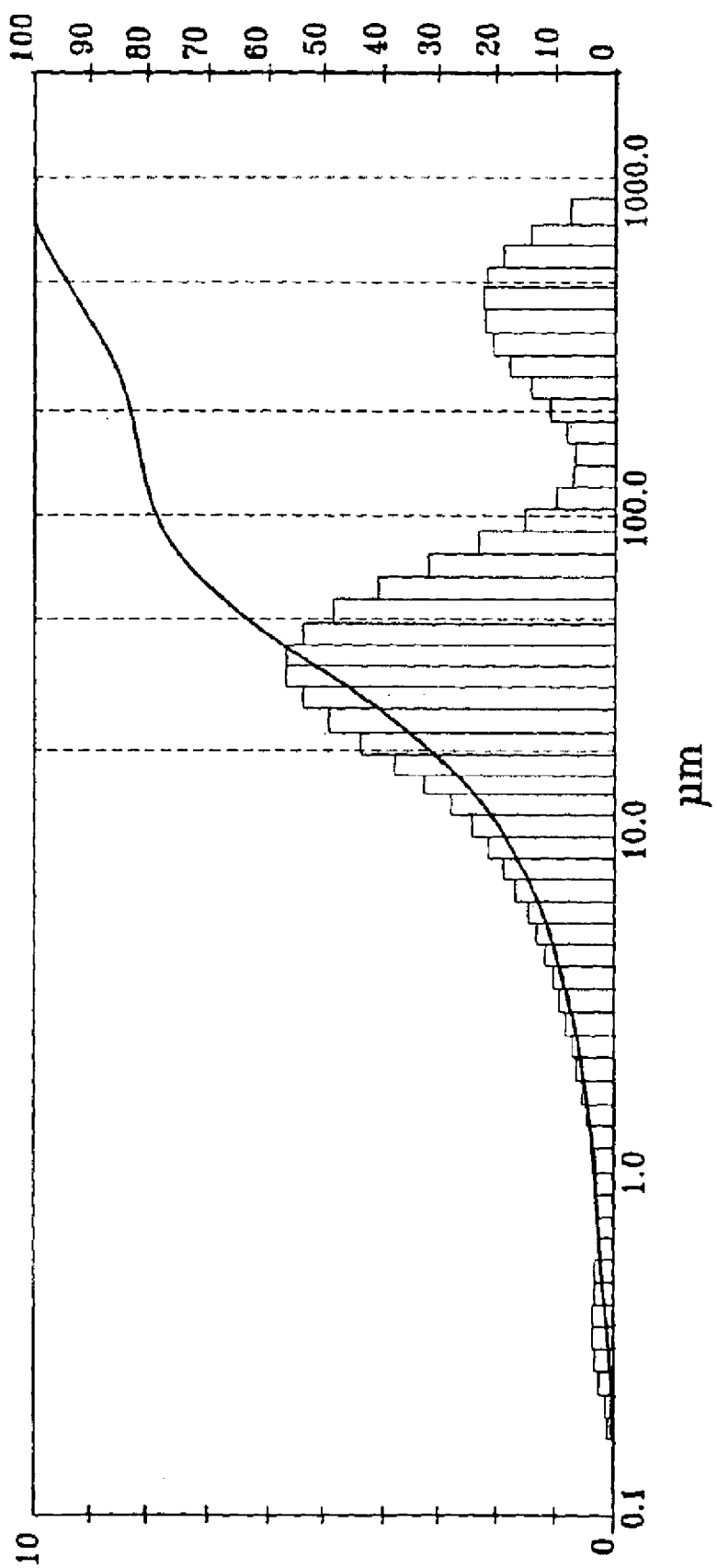
FIG. 3 is analogous to FIG. 2, in the case of another sludge.

In Examples 5 and 6, which are described below, sludges removed from another canal were treated. The composition by weight of the sludge is given in the following Table 6. The particle size distribution of the sludge is illustrated in FIG. 3, in which the scale of the abscissae represents the diameter of the particles, the scale of the left-hand ordinates represents the particle size distribution in relative units and the scale of the right-hand ordinates represents the cumulative fractions of the distribution, as % by weight of dry matter.

TABLE 6

| Constituents | Content by weight (by weight of dry matter) |
|---|---|
| Cd | 14 mg/kg |
| Co | 10 mg/kg |
| Cr | 270 mg/kg |
| Cu | 200 mg/kg |
| Ni | 150 mg/kg |
| Pb | 520 mg/kg |
| Organic matter | 160 g/kg |
| Water | 1,700 g/kg |
| $CaCO_3$ | 149 g/kg |

EXAMPLE 5

(Not in Accordance with the Invention)

In this example, starting from the sludges with the composition given in Table 6, the same procedure was carried out as in Example 1 but while increasing the amount of hydraulic-binder used: 18 g of Portland cement per 102 g of calcined sludge (i.e. 15%).

TABLE 7

| | "TL" Triple leaching | | | | |
|---|---|---|---|---|---|
| | 1st | | 2nd | | 3rd |
| Density $(kg/dm^3)$ | pH | Cr(VI) (mg/l) | pH | Cr(VI) (mg/l) | pH | Cr(VI) (mg/l) |
| 1.28 | 11.4 | 0.27 | 11.3 | 0.039 | 11.3 | N.D. |

EXAMPLE 6

(In Accordance with the Invention)

Example 6 repeats the conditions of Example 2 but while also increasing the amount of hydraulic binder used: 18 g of Portland cement per 102 g of calcined sludge (i.e. 15%).

TABLE 8

| | "TL" Triple leaching | | | | |
|---|---|---|---|---|---|
| | 1st | | 2nd | | 3rd |
| Density $(kg/dm^3)$ | pH | Cr(VI) (mg/l) | pH | Cr(VI) (mg/l) | pH | Cr(VI) (mg/l) |
| 1.26 | 11.4 | 0.15 | 11.4 | 0.02 | 11.3 | N.D. |

The sharp decrease in contamination by Cr(VI) contributed by the treatment according to the invention is again observed.

EXAMPLE 7

(In Accordance with the Invention)

In this example, the conditions of Example 6 were repeated but while adding, during the mixing of the calcined powder with the hydraulic binder, 0.25% (by weight of dry matter of the sludge) of sodium sulphite (reducing agent).

TABLE 9

| Density $(kg/dm^3)$ | Cr(VI) in the first leaching (mg/l) |
|---|---|
| 1.28 | Not detectable |

It is found that, following the addition of the reducing agent (sodium sulphite), Cr(VI) is no longer detectable. This confirms that the rendering of the Cr(VI) inert has been strengthened.

Third Series of Tests

In this series of tests, sludges removed from a port were treated. These sludges comprise sea water. Their toxic and/or heavy metal composition is given in Table 10.

TABLE 10

| Constituents | Content by weight (by weight of dry matter) |
|---|---|
| Cd | 10 mg/kg |
| Cr | 26 mg/kg |
| Cu | 39 mg/kg |
| Ni | 7.9 mg/kg |
| Pb | 158 mg/kg |
| Zn | 2,470 mg/kg |
| $CaCO_3$ | 300 g/kg |
| Organic matter | 130 g/kg |
| Water | 2,100 g/kg |

EXAMPLE 8

(In Accordance with the Invention)

In this example, the same procedure, but starting from sludges having the composition specified in Table 10, was carried out as in Example 2 except that the calcination was carried out for two hours at 625° C. and that blast furnace slag cement (comprising metallurgical slag) was used, so as to reduce the Cr(VI). The results of the mechanical and leaching tests are given in Table 11:

TABLE 11

| | "TL" Triple leaching | | | | |
|---|---|---|---|---|---|
| | 1st | | 2nd | | 3rd |
| Density $(kg/dm^3)$ | pH | Cr(VI) (mg/l) | pH | Cr(VI) (mg/l) | pH | Cr(VI) (mg/l) |
| 1.25 | 12 | <0.002 | 12 | <0.002 | 11.9 | <0.002 |

(Cd<0.005 mg/l; Cu<0.02 mg/l; Zn<0.05 mg/l; Pb<0.04 mg/l)

EXAMPLE 9

(In Accordance with the Invention)

In this example, the same procedure was carried out as in Example 8 except that the leaching test was carried out with sea water, the composition of which is given in Table 12.

TABLE 12

| Constituent | Content by weight (mg/l) |
| --- | --- |
| Na | 10,560 |
| K | 380 |
| Ca | 380 |
| Mg | 1,270 |
| Cl | 18,980 |
| $SO_4$ | 2,650 |

The results of the mechanical and leaching tests are given in Table 13:

TABLE 13

| | "TL" Triple leaching | | | | | |
| --- | --- | --- | --- | --- | --- | --- |
| | 1st | | 2nd | | 3rd | |
| Density ($kg/dm^3$) | pH | Cr(VI) (mg/l) | pH | Cr(VI) (mg/l) | pH | Cr(VI) (mg/l) |
| 1.25 | 10.8 | <0.002 | 10 | <0.002 | 8.9 | <0.002 |

(Cd<0.005 mg/l; Cu<0.02 mg/l; Zn<0.05 mg/l; Pb<0.04 mg/l)

It is observed that the presence of sea water does not in any way harm the effectiveness of the process according to the invention.

Fourth Series of Tests

In this series of tests, the procedure was carried out starting from sludges originating from a lake, these sludges having been subjected to a pretreatment during which, successively:

the particles of the sludge having a diameter of greater than 60 μm are removed;

the remaining materials are subjected to a flocculation intended to facilitate the solid-liquid separation;

the resulting sludge is subjected to pressing through a belt filter until a content of dry matter of at least 40% is obtained.

The composition of the sludges is given in Table 14.

TABLE 14

| Constituent | Content by weight (by weight of dry matter) |
| --- | --- |
| Cd | 2 mg/kg |
| Co | <3 mg/kg |
| Cr | 24 mg/kg |
| Cu | 59 mg/kg |
| Ni | 11 mg/kg |
| Pb | 395 mg/kg |
| Zn | 590 mg/kg |
| Organic matter | 100 g/kg |
| $CaCO_3$ | 570 g/kg |
| Water | 1,500 g/kg |

EXAMPLE 10

(In Accordance with the Invention)

In this example, the same procedure was carried out as in Example 8 starting from sludge removed from a lake.

The results of the mechanical and leaching tests are given in Table 15:

TABLE 15

| | "TL" Triple leaching | | | | | |
| --- | --- | --- | --- | --- | --- | --- |
| | 1st | | 2nd | | 3rd | |
| Density ($kg/dm^3$) | pH | Cr(VI) (mg/l) | pH | Cr(VI) (mg/l) | pH | Cr(VI) (mg/l) |
| 1.05 | 11.2 | <0.002 | 11.2 | <0.002 | 11.2 | <0.002 |

(Cd<0.005 mg/l; Cu<0.02 mg/l; Ni<0.05 mg/l; Zn<0.09 mg/l)

EXAMPLE 11

(In Accordance with the Invention)

In this example, the same procedure was carried out as in Example 2 except that the calcination was carried out for 2 hours at 775° C. and that no hydraulic binder was added.

The results of the leaching test are given in Table 16 and show the excellent inerting of the toxic substances:

TABLE 16

| | "TL" Triple leaching | | | | | | | | |
| --- | --- | --- | --- | --- | --- | --- | --- | --- | --- |
| | 1st | | | 2nd | | | 3rd | | |
| Density ($kg/dm^3$) | pH | Cr(VI) (mg/l) | Pb (mg/l) | pH | Cr(VI) (mg/l) | Pb (mg/l) | pH | Cr(VI) (mg/l) | Pb (mg/l) |
| 1.14 | 12.7 | 0.087 | 0.1 | 12.8 | 0.023 | 0.1 | 12.8 | 0.015 | 0.09 |

(Cd<0.005 mg/l; Cu<0.02 mg/l; Ni<0.05 mg/l; Zn<0.09 mg/l)

Furthermore, these samples proved to possess a high compressive strength of 13 $N/mm^2$, despite the absence of hydraulic binder.

This example illustrates the formation of pozzuolanic compounds during the calcination at higher temperature of sludges having a high content of calcite.

What is claimed is:

1. A process for rendering inert sludge comprising heavy metals organic matter, the process comprising:

subjecting the sludge to a calcination to produce a calcination product;

mixing the calcination product with water to provide a mixture; and subjecting the mixture to setting and curing, wherein phosphoric acid is added to the sludge before the calcination stage, and wherein the calcination is carried out under a controlled nonoxidizing atmosphere.

2. A process according to claim 1, wherein the calcination product is mixed with water and a hydraulic binder to provide said mixture.

3. A process according to claim 2, wherein the calcination temperature is greater than 550° C. and less than 800° C.

4. A process according the claim 3, wherein the calcination temperature is greater than 550° C. and less than 750° C.

5. A process according to claim 2, wherein said mixture comprises an amount by weight of hydraulic binder of greater than 2% and less than 20% of the calcination product.

6. A process according to claim 1, wherein he setting and the curing of the mixture are carried out at its final storage site.

7. A process according to claim 6, wherein the final storage site is a disused quarry.

8. A process according to claim 1, wherein said water comprises a reducing additive.

9. A process according to claim 8, wherein the reducing additive is sodium sulphite.

10. A process according to claim 1, wherein the sludge comprises sediments originating from the cleaning out of waterways.

11. A process according to claim 1, wherein the sludge comprises 100–160 g/kg of organic matter.

12. A process according to claim 2, wherein the sludge comprises particles having a particle size of from 0.1 to 100 microns.

13. A process according to claim 1, wherein said phosphoric acid is added to the sludge in an amount of from 1% less than 15% with respect to the weight of dry matter therein.

14. A process according to claim 1, wherein said phosphoric acid is added to the sludge in an amount of 2–6% with respect to the weight of dry matter therein.

15. A process according to claim 1, wherein said sludge comprises greater than 20 % by weight water.

16. A process according to claim 1, wherein said sludge comprises 30–60% by weight water.

17. A process according to claim 1, wherein said sludge comprises less than 70% by weight water.

18. A process according to claim 1, wherein the amount of water is sufficient to produce a plastic phase.

19. A process according to claim 16, wherein said phosphoric acid is added to the sludge in an amount of 2–6% with respect to the weight of dry matter therein.

* * * * *

UNITED STATES PATENT AND TRADEMARK OFFICE
CERTIFICATE OF CORRECTION

PATENT NO. : 6,962,562 B2  Page 1 of 1
DATED : November 8, 2005
INVENTOR(S) : Guy Depelsenaire et al.

It is certified that error appears in the above-identified patent and that said Letters Patent is hereby corrected as shown below:

Column 12,
Line 10, after "1%" insert -- to --.

Signed and Sealed this

Twenty-eighth Day of March, 2006

JON W. DUDAS
*Director of the United States Patent and Trademark Office*